Patented Apr. 18, 1939

2,154,436

UNITED STATES PATENT OFFICE 2,154,436

ABRASIVE

Willard E. Catlin, Wilmington, Del., assignor to E. I. du Pont de Nemours & Company, Wilmington, Del., a corporation of Delaware No Drawing. Application April 13, 1937, Serial No. 136,673

5 Claims. (Cl. 51—280)

This invention relates to abrasives and more particularly to new abrasive compositions and abrasive implements.

It is known that abrasive or polishing materials, such as emery, quartz, glass powder, carborundum, corundum, and the like, in pulverulent form can be compounded with bonding materials, such as clay, glue, shellac, rubber, nitrocellulose, and resinous materials, e. g., phenol-formaldehyde resins. These products, however, have certain disadvantages. Thus, abrasive implements prepared from vitreous or ceramic types of binders are brittle and therefore easily broken. This is true also of many resinous binders. On the other hand, materials, such as glue, shellac, nitrocellulose, and to some extent rubber and phenol-formaldehyde resins, soften or are subject to decomposition at the temperature developed in grinding and polishing operations. Furthermore, many of these bonding materials, e. g., clay, rubber, and phenol-formaldehyde resins, require special compounding and/or baking treatments in the preparation of abrasive compositions. Moreover, when once formed, such compositions cannot be reformed in another shape owing to the infusibility or thermal instability of the bonding material.

An object of this invention is to provide a new and improved type of abrasive composition. Another object is to prepare abrasive, grinding, or polishing implements in which the abrasives are bonded by means of a composition of high thermal stability, strength, and toughness. Other objects will appear hereinafter.

These objects are accomplished by preparing an intimate mixture of an abrasive material in a suitable state of subdivision with a synthetic linear condensation polyamide, preferably a polyamide having an intrinsic viscosity above 0.4, and molding said mixture into a suitable article.

By the term "linear condensation polyamide" I mean to designate polyamide compounds of the types herein disclosed and their equivalents, whether or not such compounds are produced by chemical condensation or by some other process.

Before describing in detail the preparation of the abrasive compositions of this invention, further reference should be made to the synthetic linear condensation polyamides used in preparing the abrasive compositions. The term "synthetic linear condensation polyamide" implies that the polyamides are long chain, i. e., two-dimensional polymers prepared by an artificial process. Synthetic linear condensation polyamides are of two types, those derived from polymerizable monoaminomonocarboxylic acids and their amide-forming derivatives (ester, acid halide, anhydride, and amide), and those derived from the reaction of suitable diamines with suitable dicarboxylic acids or amide-forming derivatives of dibasic carboxylic acids. On hydrolysis with strong mineral acids the polyamides yield the amide-forming derivatives from which they were derived. Typical synthetic linear condensation polyamides are described in Patents 2,071,250 and 2,071,253.

Of the synthetic linear condensation polyamides the most useful as bonding agents for the preparation of abrasive compositions are those having an intrinsic viscosity above 0.4, where intrinsic viscosity is defined as $$\frac{\log_e \eta_r}{C}$$

where $\eta_r$ is the viscosity of a dilute meta-cresol solution of the polyamide divided by the viscosity of meta-cresol in the same units and at the same temperature and C is the concentration in grams of polyamide per 100 cc. of solution. In general the strength and toughness of a polyamide increases with the intrinsic viscosity, polyamides having intrinsic viscosity between 0.6 and 2.0 being particularly useful.

As described in the mentioned patents, highly condensed synthetic linear condensation polyamides are capable of being formed into useful filaments, films, etc. These filaments are further characterized by the fact that they are converted into oriented fibers of greater utility than the original filaments on application of stress therein referred to as "cold-drawing". The fiber-forming synthetic linear condensation polyamides are especially useful in the preparation of the abrasive compositions of this invention.

For the most part, synthetic linear condensation polyamides derived from straight chain amino acids or from the reaction of straight chain diamines with straight chain dicarboxylic acid are characterized by high melting points, generally above 175° C. and often above 230° C., are substantially thermally stable even at their melting points, are microcrystalline in character (non-resinous), and are insensitive to water and most organic solvents. They are unaffected by oils, e. g., those sometimes added to the surface of grinding implements in the course of their use. These properties, together with their unusual high strength (5000–20,000 lb./sq. in. in sheet form), lightness (density 1.0–1.2), toughness, and strong bonding characteristics make them very useful in making abrasive implements.

The abrasive compositions of this invention may be prepared in a number of ways. One method consists in making a thorough mixture of the abrasive material in suitable pulverulent form with the finely divided polyamide and molding the mixture in a mold or die of the desired shape. Another method for preparing an intimate mixture of the abrasive material and the polyamide consists in stirring the abrasive into the molten polyamide and then allowing the mixture to solidify. Still another method consists in adding the abrasive with vigorous stirring to a viscous solution of the polyamide in a suitable solvent, e. g., phenol, and then pouring the dispersion into a non-solvent for the polyamide which causes the polyamide and abrasive to precipitate together in an intimately mixed form. This precipitate can then be molded. In some cases it is possible to secure a satisfactory polyamide-abrasive mixture by adding the abrasive to the monomeric reactants previous to the preparation of the polyamide therefrom or to add the abrasive to the polyamide during the course of its preparation.

Thorough mixing of the abrasive and polyamide is desirable, particularly if the abrasive composition is to be used as a high speed grinding or polishing wheel. If the polyamide and abrasive are not homogeneously mixed the wheel will not be properly balanced.

The molding of the polyamide-abrasive mixture is accomplished by heating the mixture, preferably under pressure, in a suitable mold until the polyamide softens and becomes completely fused. Only a few minutes heating at the softening temperature is required. The mixture is then cooled. If the molded object is thin it is advantageous to cool it rapidly, e. g., by immersion in water. On the other hand, if the article is thick or massive slow cooling (annealing) is preferable since it gives a product which is tougher and more free from strains. The temperature to which the mixture is heated to effect molding will depend upon the melting point of the polyamide and to some extent upon the pressure applied. The preferred polyamides for use in this invention are those having a high melting point (about 100° C. and preferably above 200° C.). Polyhexamethylene adipamide, which melts at about 250° C. in air and can be obtained as a high viscosity product of great toughness, is a particularly valuable bonding agent for the preparation of abrasive articles.

The following examples in which the parts are by weight are illustrative of methods for practicing my invention:

Example I

Twelve parts of a polyamide interpolymer of intrinsic viscosity 1.05 derived by condensation polymerization from equimolecular parts of hexamethylene diammonium adipate and decamethylene diammonium sebacate was dissolved in 88 parts of 90% formic acid. To this solution was added 48 parts of 60 mesh aluminum oxide (corundum, $Al_2O_3$). The mixture was spread out in a thin layer and heated to 110° C. to remove the solvent. A grinding wheel was prepared from the dried mixture by molding it in a suitable mold in a press at approximately 158° C. under a pressure of 3800 pounds per square inch. The product was then cooled and removed from the mold. The resultant grinding wheel showed good abrasive properties and unusually good mechanical strength and toughness.

Example II

To 50 parts of a 25% solution of polyhexamethylene adipamide (intrinsic viscosity, 0.95) in 88% phenol there was added 50 parts of 60 mesh emery. Ethyl acetate was added to this mixture which caused the polyamide and abrasive to separate together. The polymer-abrasive mixture was dried at 100° C. It was then molded in the form of an abrasive wheel at 252° C. under a pressure of 3800 pounds per square inch.

Example III

Thirty parts of carborundum of 60 mesh was mixed with 12 parts of finely divided polyhexamethylene adipamide of intrinsic viscosity 0.85 and molded in a press under the conditions described in Example II. The product was very tough and had good abrasive properties.

Example IV

To 50 parts of a 25% solution of polyhexamethylene adipamide (intrinsic viscosity, 0.81) in phenol there was added 12.5 parts of diatomaceous earth. After precipitation of the polyamide and abrasive from the solution by the addition of an excess of alcohol-ethyl acetate mixture, the precipitate was dried and then molded at 260° C. under a pressure of 3000 pounds per square inch.

A valuable class of polyamides for the preparation of the abrasive articles described herein are those derived from diamines of formula $NH_2CH_2RCH_2NH_2$ and dicarboxylic acids of formula $HOOCCH_2R'CH_2COOH$ or amide-forming derivatives thereof, in which R and R' are divalent hydrocarbon radicals free from olefinic and acetylenic unsaturation and in which R has a chain length of at least two carbon atoms. An especially valuable group of polyamides within this class are those in which R is $(CH_2)_x$ and R' is $(CH_2)_y$ where $x$ is at least two. Various other types of polyamides, as for instance those derived from polymerizable monoaminomonocarboxylic acids or amide-forming derivatives thereof are also useful in the formation of abrasive articles.

As illustrated in Example I interpolymers derived from mixtures of polyamide-forming reactants are also useful. Mixtures of preformed polyamides are likewise suitable. Typical examples of useful polyamides for the preparation of abrasive articles of this invention are listed below:

| Polyamide derived from— | M. P. ° C. |
|---|---|
| Ethylenediamine and sebacic acid | 254 |
| Tetramethylenediamine and adipic acid | 278 |
| Tetramethylenediamine and suberic acid | 250 |
| Tetramethylenediamine and azelaic acid | 223 |
| Tetramethylenediamine and sebacic acid | 239 |
| Pentamethylenediamine and glutaric acid | 198 |
| Pentamethylenediamine and adipic acid | 223 |
| Hexamethylenediamine and β-methyl adipic acid | 190 |
| Hexamethylenediamine and sebacic acid | 209 |
| Octamethylenediamine and adipic acid | 235 |
| Octamethylenediamine and sebacic acid | 197 |
| Decamethylenediamine and carbonic acid | 200 |
| Decamethylenediamine and oxalic acid | 229 |
| Decamethylenediamine and adipic acid | 230 |
| Decamethylenediamine and sebacic acid | 194 |
| Decamethylenediamine and p-phenylene diacetic acid | 242 |
| p-Xylylenediamine and sebacic acid | 268 |
| p-Xylylenediamine and p,p'-diphenylolpropane diacetic acid | 136 |
| Pentamethylenediamine and diglycollic acid | 130 |
| 3,3'-diamino propyl ether and adipic acid | 190 |
| 6-aminocaproic acid | 203 |
| 9-aminononanoic acid | 195 |

The melting points indicated in the table were determined by placing fine particles of the polyamide on a heated melting block in the presence of air and noting the fusion temperature.

As indicated in the examples, the ratio of bonding agent to abrasive can be varied within wide limits. The ratio in which the binder and abrasive are used will depend upon the density and particle size of the abrasive and upon the properties desired in the resultant product. Owing to the great bonding strength of the synthetic linear condensation polyamides, they can be used in less amount than most bonding materials. For most purposes the weight of polyamide used will range from 10 to 75% of the weight of the abrasive, but it is to be understood that the invention is not limited to the use of the polyamide in these proportions.

The bonding agent used in the preparation of the abrasive articles of this invention need not necessarily consist solely of polyamides. It is within the scope of this invention to use softening or plasticizing agents in conjunction with the polyamides, e. g., o-hydroxydiphenyl and diphenylolpropane. Pigments, fillers, resins, cellulose derivatives, other types of synthetic linear condensation polymers, etc. may also be employed as modifying agents.

As examples of other abrasives which may be bonded to advantage with synthetic linear condensation polyamides might be mentioned diamond, quartz, sand, garnet, steel, feldspar, glass, pumice, and chalk. The type and particle size of the abrasive selected for a given article will, of course, depend upon the use to which it is to be put. If desired, a mixture of different abrasives may be used.

As examples of useful abrasive implements which can be made with the use of the bonding agents of this invention may be mentioned grinding wheels, polishing wheels, millstones, scythe stones, whetstones, pulpstones, hones, cutting instruments, drilling tools, sandpaper, polishing cloth, etc.

The abrasive articles made from the composition described herein are particularly valuable because of their unusually great toughness, durability, and thermal stability. They are capable of withstanding rough treatment without breaking. Since the bonding material has good thermal stability and a high melting point, the composition is unaffected by the heat developed in its use as a grinding or polishing device. The abrasive articles of this invention are readily prepared by simple molding procedures. The bonding material does not become infusible on molding and for this reason can be reclaimed or reformed, if desired, into a different article.

As many apparently widely differen. embodiments of this invention may be made without departing from the spirit and scope thereof, it is to be understood that I do not limit myself to the specific embodiments thereof except as defined in the appended claims.

I claim:

1. An abrasive composition comprising finely divided abrasive material intimately mixed and bonded with synthetic linear condensation polyamide.

2. The abrasive composition set forth in claim 1 in which said polyamide is the reaction product of a diamine and a substance selected from the class consisting of dibasic acids and amide-forming derivatives of dibasic acids.

3. The abrasive composition set forth in claim 1 in which said polyamide is the reaction product of a diamine of the formula $NH_2CH_2RCH_2NH_2$ and a compound of the class consisting of dicarboxylic acids of the formula $$HOOCCH_2R'CH_2COOH$$

and amide-forming derivatives thereof, R and R' in said formulae being divalent hydrocarbon radicals free from olefinic and acetylenic linkages and R having a chain length of at least two carbon atoms.

4. An abrasive composition comprising finely divided abrasive material intimately mixed and bonded with a synthetic linear condensation polyamide having an intrinsic viscosity above 0.4 and a softening point above 100° C.

5. The abrasive composition set forth in claim 1 in which said polyamide is polymeric hexamethylene adipamide.

WILLARD E. CATLIN.